United States Patent [19]
Mizuno

[11] Patent Number: 5,696,561
[45] Date of Patent: Dec. 9, 1997

[54] APPARATUS FOR IMPROVING PICTURE QUALITY OF A BOX DISPLAY OF TELETEXT CHARACTER DATA BY LOWERING A CONTRAST OF THE WHOLE SCREEN ON WHICH THE BOX DISPLAY IS MADE

[75] Inventor: Shingo Mizuno, Daito, Japan

[73] Assignee: Funai Electric Co., Ltd., Osaka, Japan

[21] Appl. No.: 372,369

[22] Filed: Jan. 13, 1995

[30] Foreign Application Priority Data

Jan. 14, 1994 [JP] Japan .................. HEI. 6-015835

[51] Int. Cl.$^6$ ..................................... H04N 5/57
[52] U.S. Cl. .................. 348/468; 348/563; 348/589; 348/678
[58] Field of Search ................... 348/678, 380, 348/461, 469, 553, 563, 564, 473, 476, 477, 478, 584, 589, 679, 689; H04N 5/57, 5/235, 5/278

[56] References Cited

U.S. PATENT DOCUMENTS 4,549,217  10/1985  Sendelweck ................ 348/380
5,345,278   9/1994  Choi ............................ 348/686

*Primary Examiner*—John K. Peng
*Assistant Examiner*—Nathan J. Flynn
*Attorney, Agent, or Firm*—Bacon & Thomas

[57] ABSTRACT

An apparatus with a built-in teletext broadcasting decoder including a contrast adjusting circuit. When a box display of character data by teletext broadcasting is specified, the contrast adjusting circuit operates to lower the contrast of the screen in which the box display is made, thereby to prevent the box display from being deformed.

3 Claims, 4 Drawing Sheets

APPARATUS FOR IMPROVING PICTURE QUALITY OF A BOX DISPLAY OF TELETEXT CHARACTER DATA BY LOWERING A CONTRAST OF THE WHOLE SCREEN ON WHICH THE BOX DISPLAY IS MADE

BACKGROUND OF THE INVENTION

This invention relates to an apparatus, such as a television set, a video tape recorder, and a television set combined with a video tape recorder, which has a built-in teletext broadcasting (including the Closed Caption System) decoder.

FIG. 3 is a block diagram showing the arrangement of a conventional television set with a built-in teletext broadcasting decoder of this type.

In FIG. 3, reference numeral 1 designates an antenna for receiving teletext broadcasting signals; 2, a tuner for selecting a broadcasting signal of a desired channel; 3, a television signal processing section; and 4, a beam deflecting circuit for deflecting the electron beam of a cathode-ray tube (CRT) 5. The television signal processing section 3 includes: an audio amplifier circuit 3a for detecting and amplifying an audio intermediate frequency signal; a video amplifier circuit 3b for detecting and amplifying a video intermediate frequency signal; a horizontal/vertical synchronizing signal forming circuit 3c for forming a horizontal synchronizing signal and a vertical synchronizing signal; and a luminance/color separating circuit 3d for separating a luminance signal and a color signal. The luminance/color separating circuit 3d includes a video chroma circuit 3e, to which a contrast control signal inputting circuit 3f applies a contrast control signal for adjustment of a contrast.

The television set further comprises a light receiving unit 6, and a teletext broadcasting signal processing section 7. The light receiving unit 6 is adapted to receive a control signal (of infrared ray) from a remote controller (not shown) to control the operation of the television set, and apply a data signal to a system control section 8 (described later). The teletext broadcasting signal processing section 7 includes: a preprocessing circuit 7a for extracting character data from a color television signal provided by the television signal processing section 3; a decoding circuit 7b which decodes the character data thus extracted, and outputs display data; and a screen display control circuit 7c which forms RGB signals and blanking signals corresponding to the character data in synchronization with the horizontal and vertical synchronizing signals provided by the beam deflecting circuit 4, and outputs the formed signals to the television signal processing section 3. The aforementioned system control section 8 incorporates the above-described teletext broadcasting signal processing section 7. The section 8 is made up of a microcomputer (hereinafter referred to as "a microcomputer 8", when applicable).

The contrast control signal inputting circuit 3f is designed as shown in FIG. 4. That is, the circuit 3f has a contrast control signal amplifying transistor 9, the base of which is connected through a resistor 10 to a contrast control signal output port 11 of the microcomputer 8, with the collector connected through a series circuit of a resistor 12 and a diode 13 to a contrast control signal input terminal 14 of the video chroma circuit 3e. The diode 13 is shunted by a resistor 15. The anode of the diode 13 is grounded through a resistor 16. The contrast control signal input terminal 14 is grounded through a smoothing capacitor 17.

The television set thus organized operates as follows:

In the case where, with a desired channel selected with the remote controller, a teletext broadcasting signal is received, the television signal of the channel thus selected is applied through the antenna 1 and the tuner 2 to the television signal processing section 3. In the television signal processing section 3, the video signal is amplified by the video amplifier circuit 3b, while in the teletext broadcasting signal processing section 7, which is a teletext broadcasting decoder, the preprocessing circuit 7a operates to separate character data (hereinafter referred to as "a caption signal", when applicable) multiplexed with the twenty-first (21st) scanning line of the video signal. The caption signal thus separated is decoded by the decoding circuit 7b, the output of which is applied to the screen display control circuit 7c. The screen display control circuit 7c applies RGB signals and blanking signals (BL) corresponding to the character data together with a station selection displaying signal to the television signal processing section 3 in synchronization with the horizontal and vertical synchronizing signals provided by the beam deflecting circuit 4. Thus, the display data is applied to the video chroma circuit 3e of the luminance/color separating circuit 3d in the television signal processing section 3, so that it is displayed on the screen of the cathode-ray tube 5 together with the image.

The contrast control signal applied to the contrast control signal output port 11 of the microcomputer 8 is converted into a DC signal by the contrast control signal inputting circuit 3f, which is applied to the contrast control signal input terminal 14 of the video chroma circuit 3e, to adjust the contrast of the image on the screen of the cathode-ray tube 5.

The above-described conventional television set thus organized suffers from the following problem:

In the case where a box display (a rectangular display of white or colored characters in a black background) of character data by teletext broadcasting is specified, the box display which should be rectangular, is deformed in configuration as shown in FIG. 5.

In this case, part of the background of the television image appears along the periphery of the box display. If it is high in brightness; more specifically, if the part of the background is much higher in brightness than the dark background of the box display, then the deflection of the electron beam is distorted because of the following reason:

A beam current determining the brightness of the screen of the cathode-ray tube 5 is most greatly changed with a bright part and a dark part, especially with the border between the box display and its background. In the vicinity of the border, the dynamic regulation of the flyback transformer becomes unable to follow the variation of the beam current. As a result, the electron beam deflection is distorted; that is, the box display is deformed in configuration as shown in FIG. 5, and accordingly lowered in picture quality. In FIG. 5, reference numeral 19 (dotted line) designates a satisfactory box display on the cathode-ray tube 5; and 18 (solid line), a box display deformed in the above-described manner.

SUMMARY OF THE INVENTION

Accordingly, an object of the invention is to eliminate the above-described difficulty accompanying a conventional television set with a built-in teletext broadcasting decoder.

More specifically, an object of the invention is to provide an apparatus such as a television set with a built-in teletext broadcasting decoder in which the box display of character data by teletext broadcasting is improved in picture quality.

To achieve the foregoing object, the invention provides an apparatus with a built-in teletext broadcasting decoder which performs a box display of character data multiplexed with a video signal, and has a teletext broadcasting processing signal section which superposes the character data on an image formed by the video signal, the apparatus including: contrast adjusting means for lowering, when a box display of character data by teletext broadcasting is specified, a contrast of a whole screen on which the box display is made.

DETAILED DESCRIPTION OF THE PREFERRED EMBODIMENT

Figure 3:
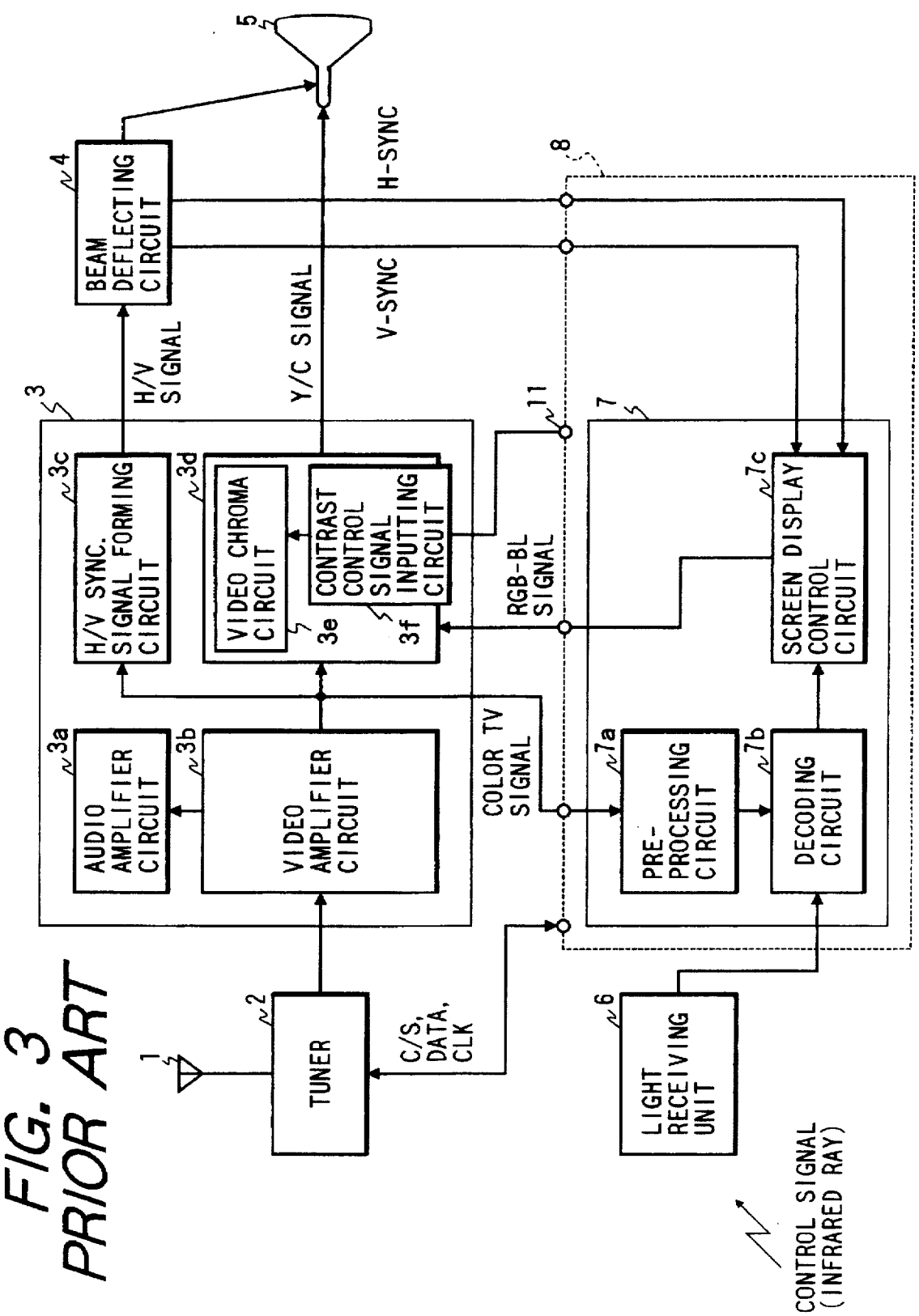
FIG. 3 is a block diagram showing the arrangement of a conventional television set with a built-in teletext broadcasting decoder.
Figure 4:
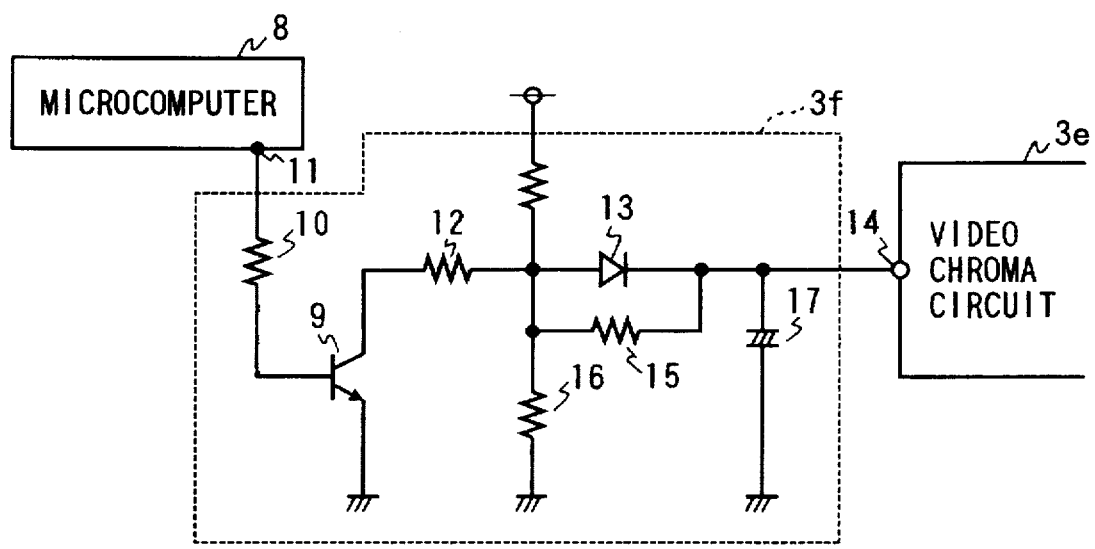
FIG. 4 is a circuit diagram of the arrangement of a contrast control signal inputting circuit in the conventional television set shown in FIG. 3.

A television set with a built-in teletext broadcasting decoder, which constitutes a preferred embodiment of the invention, will be described with reference to FIG. 1, in which parts corresponding functionally to those which have been described with reference to FIG. 3 are therefore designated by the same reference numerals or characters.

Figure 1:
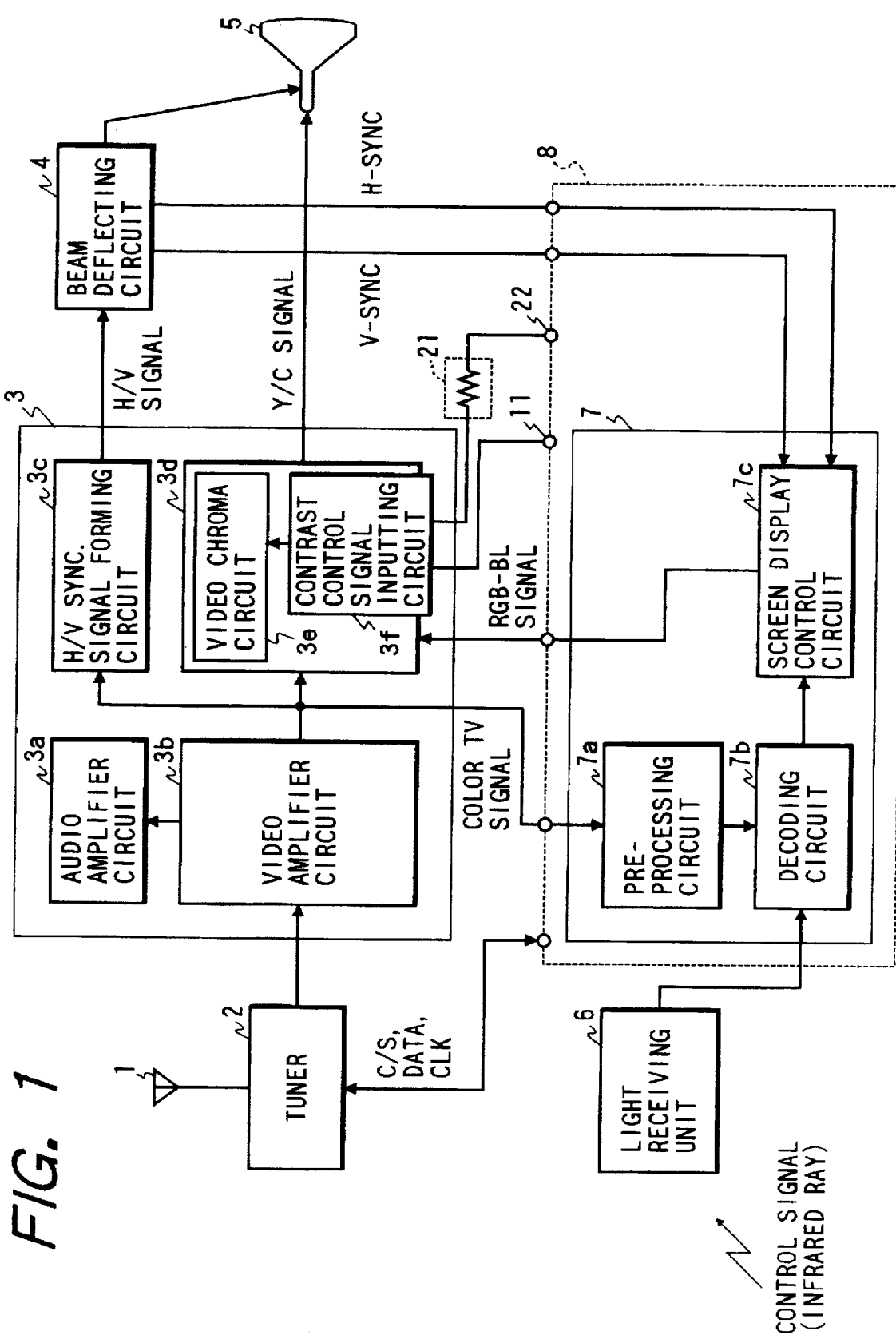
FIG. 1 is a block diagram showing the arrangement of a television set with a built-in teletext broadcasting decoder, which constitutes a preferred embodiment of the invention.

In FIG. 1, reference numeral 21 designates a contrast adjusting circuit which, when a box display of character data by teletext broadcasting is specified, lowers the contrast of the whole screen on which the box display is made.

Figure 2:
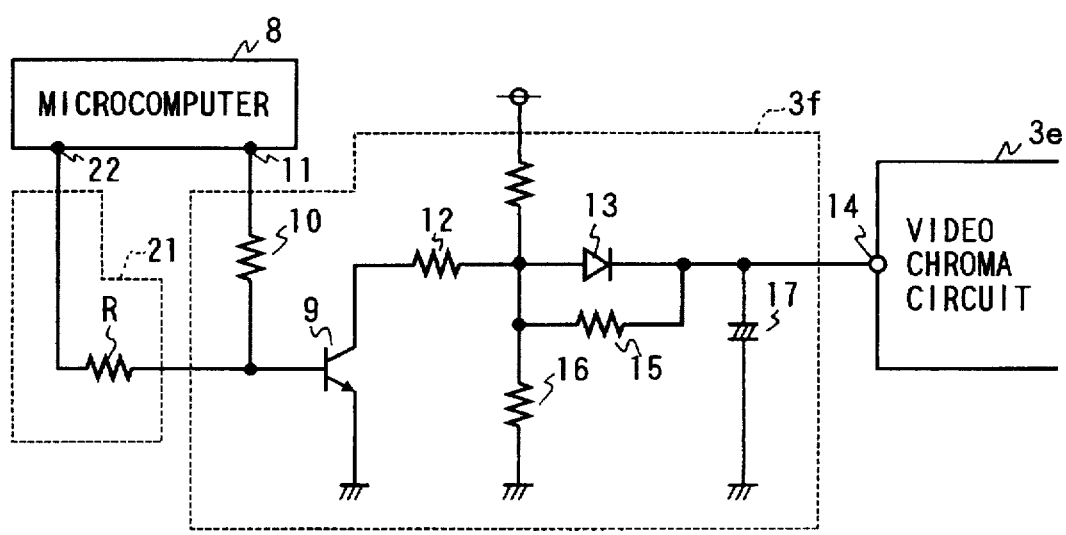
FIG. 2 is a circuit diagram of a contrast adjusting circuit in the television set shown in FIG. 1.

The contrast adjusting circuit 21, as shown in FIG. 2, is made up of a resistor R which is connected between the base of a contrast control signal amplifying transistor 9 and a contrast adjusting signal output port 22 of a microcomputer 8.

The contrast adjusting circuit 21 operates as follows:

In the microcomputer 8, the contrast adjusting signal output port 22 is held at the "L" level until a box display of character data by teletext broadcasting is specified.

Figure 5:
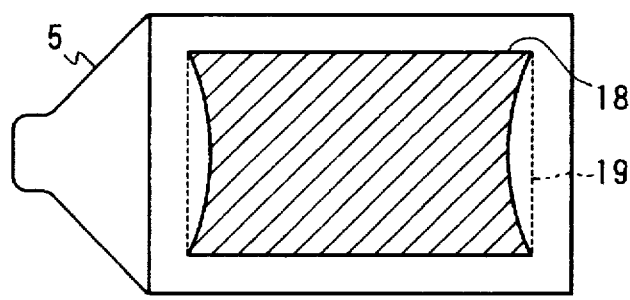
FIG. 5 is an explanatory diagram showing a box display of character data on the screen of the cathode-ray tube in the conventional television set shown in FIG. 3.

When a box display is specified, for instance, with the remote controller, the microcomputer 8 outputs an "H" level contrast adjusting signal through the contrast adjusting signal output port 22. As a result, the potential level of the collector of the transistor 9 approaches the ground level, so that the DC voltage applied to the contrast control signal input terminal 14 of the video chroma circuit 3e is decreased towards the ground side. The video chroma circuit 3e adjusts the contrast according to the decrease of the DC voltage of the contrast control signal applied to the contrast control signal input terminal 14, thereby to lower the brightness of the screen in its entirety on which the box display is made. This reduces the difference in brightness between the box display and its background, thus suppressing the deformation of the box display which is due to the distortion in deflection of the electron beam. As a result, the box display is satisfactory in configuration as indicated at 19 in FIG. 5.

As is apparent from the above description, when a box display of character data by teletext broadcasting is specified, the display screen is decreased in brightness in its entirety, which suppresses the deformation in configuration of the box display.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An apparatus with a built-in teletext broadcasting decoder which performs a box display of character data multiplexed with a video signal, said box display forming a display of white or colored characters on a black background, said teletext broadcasting decoder including a teletext broadcasting processing signal section which superimposes the box display on an image formed by the video signal, said apparatus comprising:

contrast adjusting means for preventing distortion of said box display by lowering, when said box display is specified, a contrast of a whole screen on which the box display is made.

2. The apparatus according to claim 1, wherein said contrast adjusting means includes means for decreasing a DC voltage of a contrast control signal for adjusting the contrast so as to lower the contrast when the box display is specified.

3. The apparatus according to claim 2, wherein said decreasing means includes a resistor.

* * * * *